Nov. 6, 1945.   M. KATCHER   2,388,418
HYDRO-KINETIC TORQUE CONVERTER
Filed Sept. 3, 1943   5 Sheets-Sheet 1
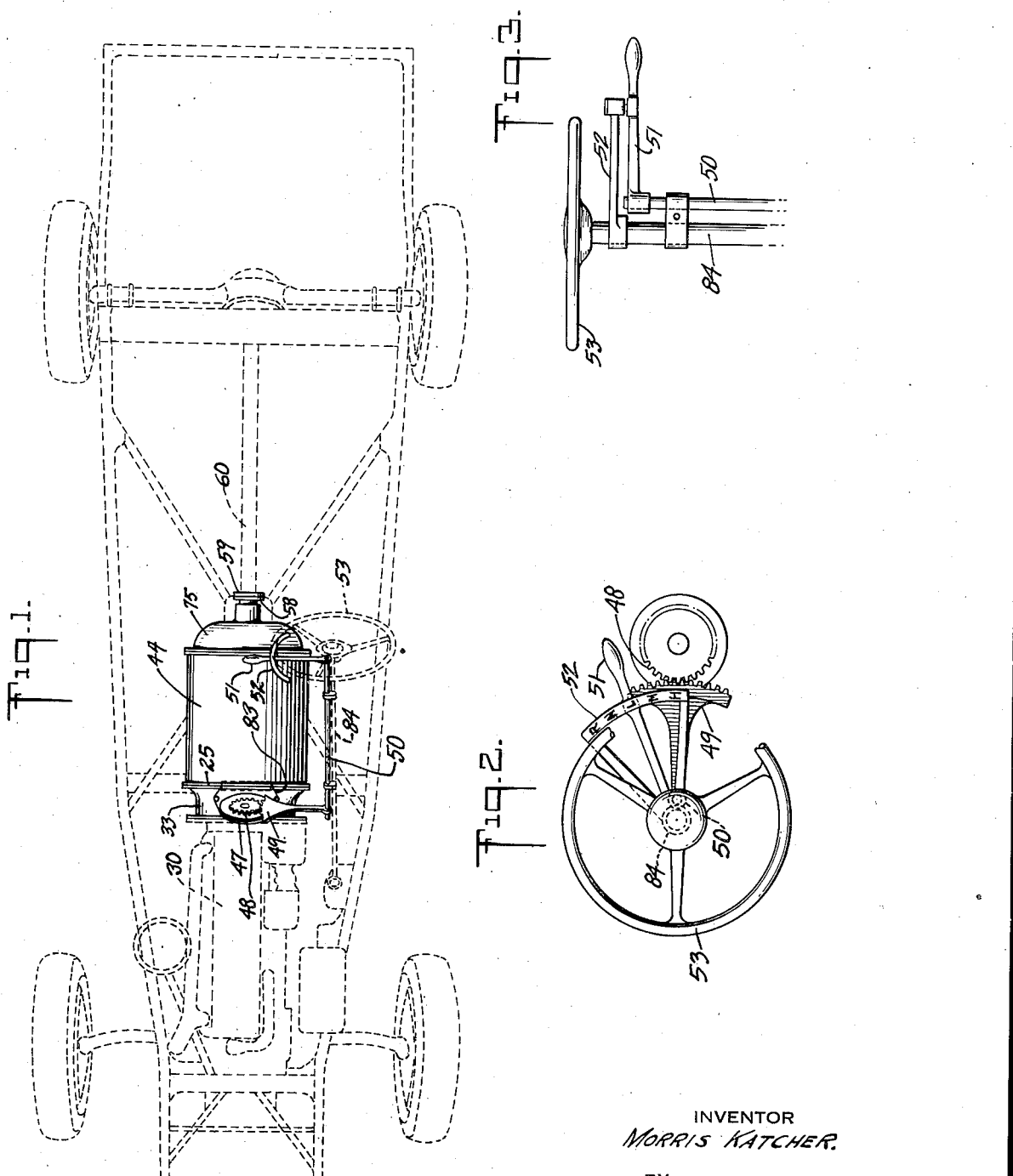
INVENTOR
*Morris Katcher.*
BY
*Emanuel Scheyer*
ATTORNEY

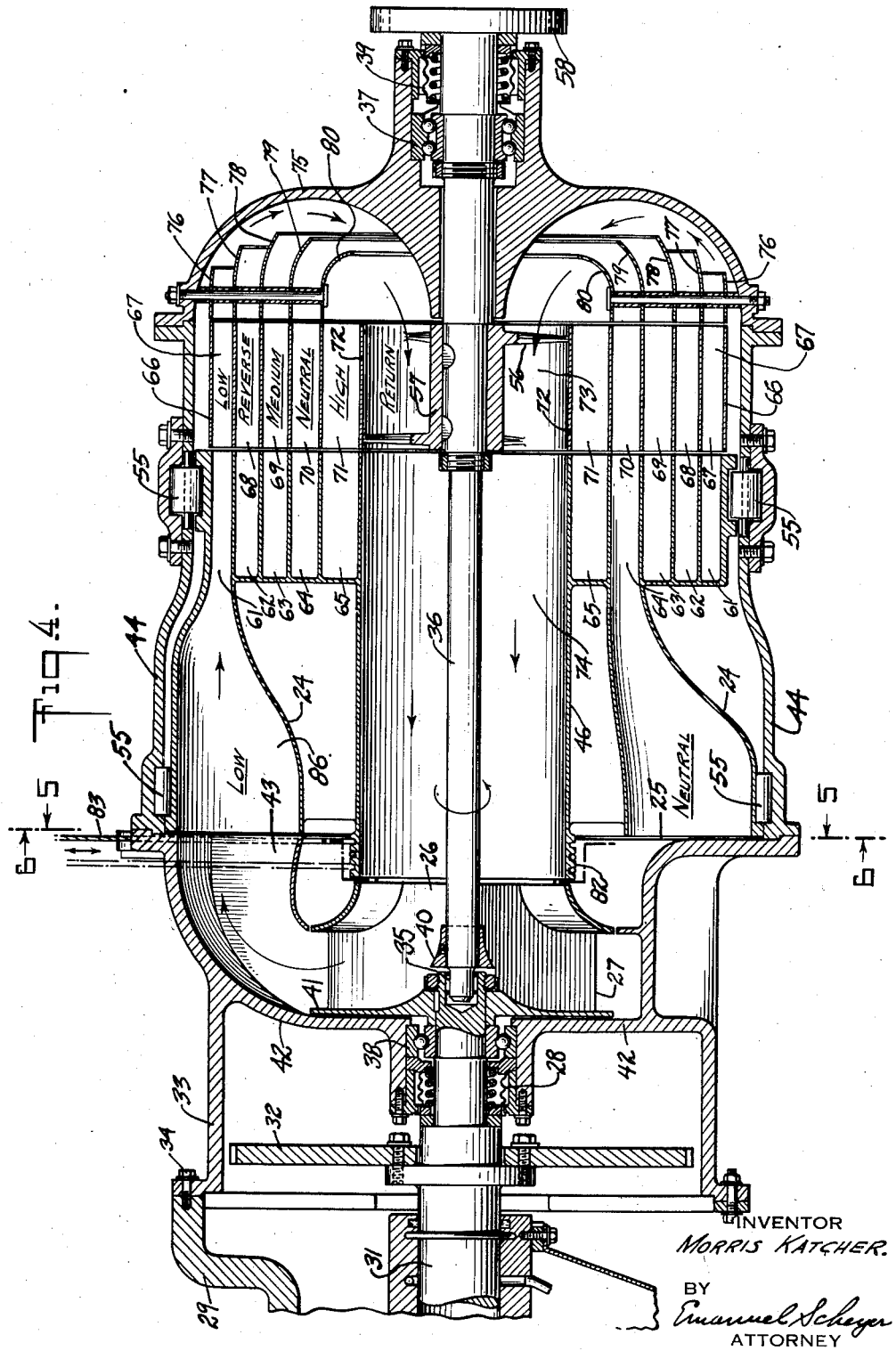

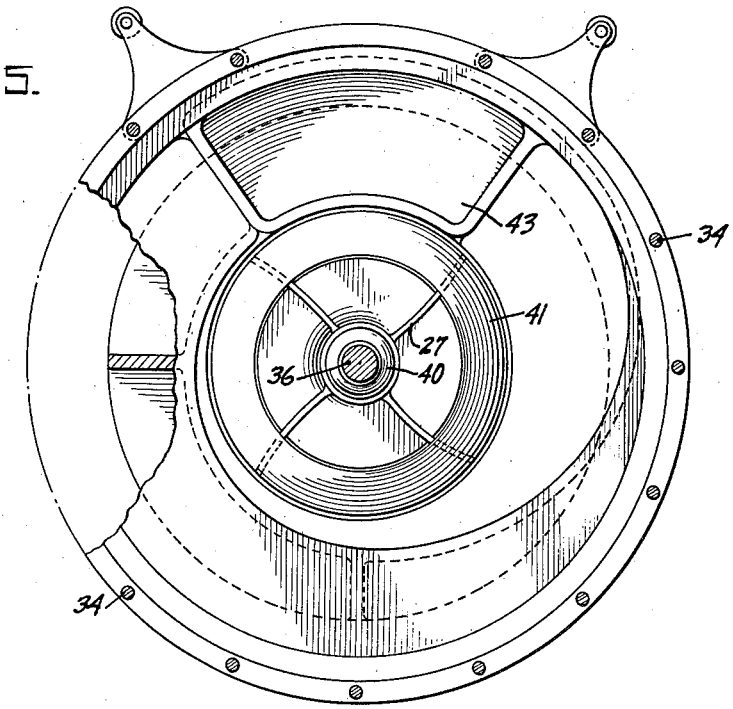
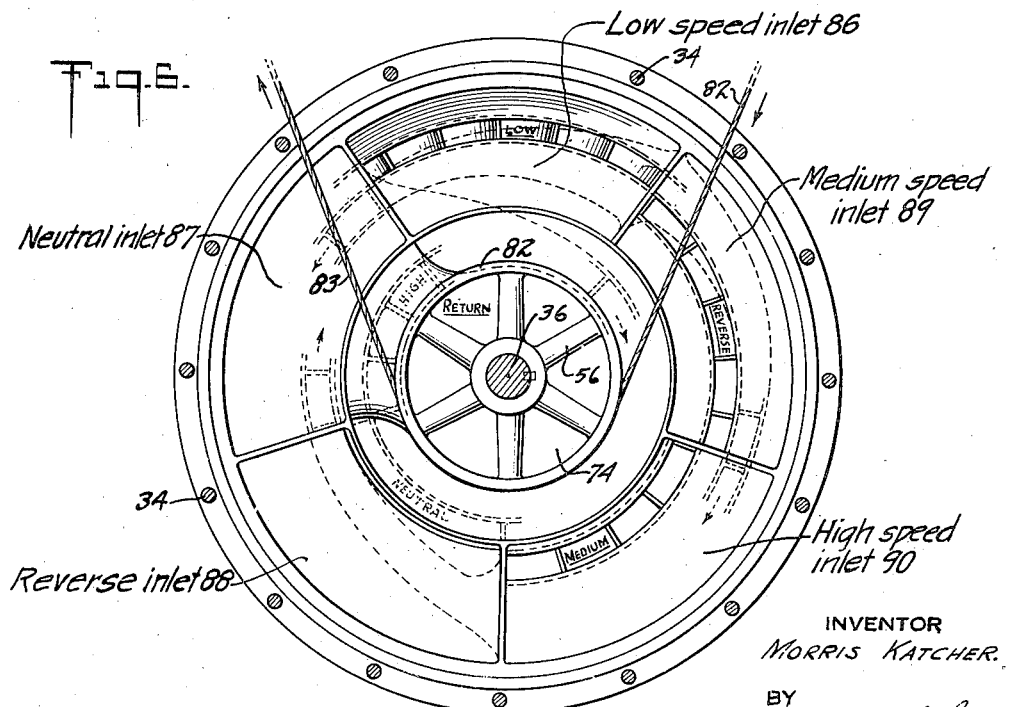

Low

High

INVENTOR.
MORRIS KATCHER.
BY
Emanuel Scheyer
ATTORNEY

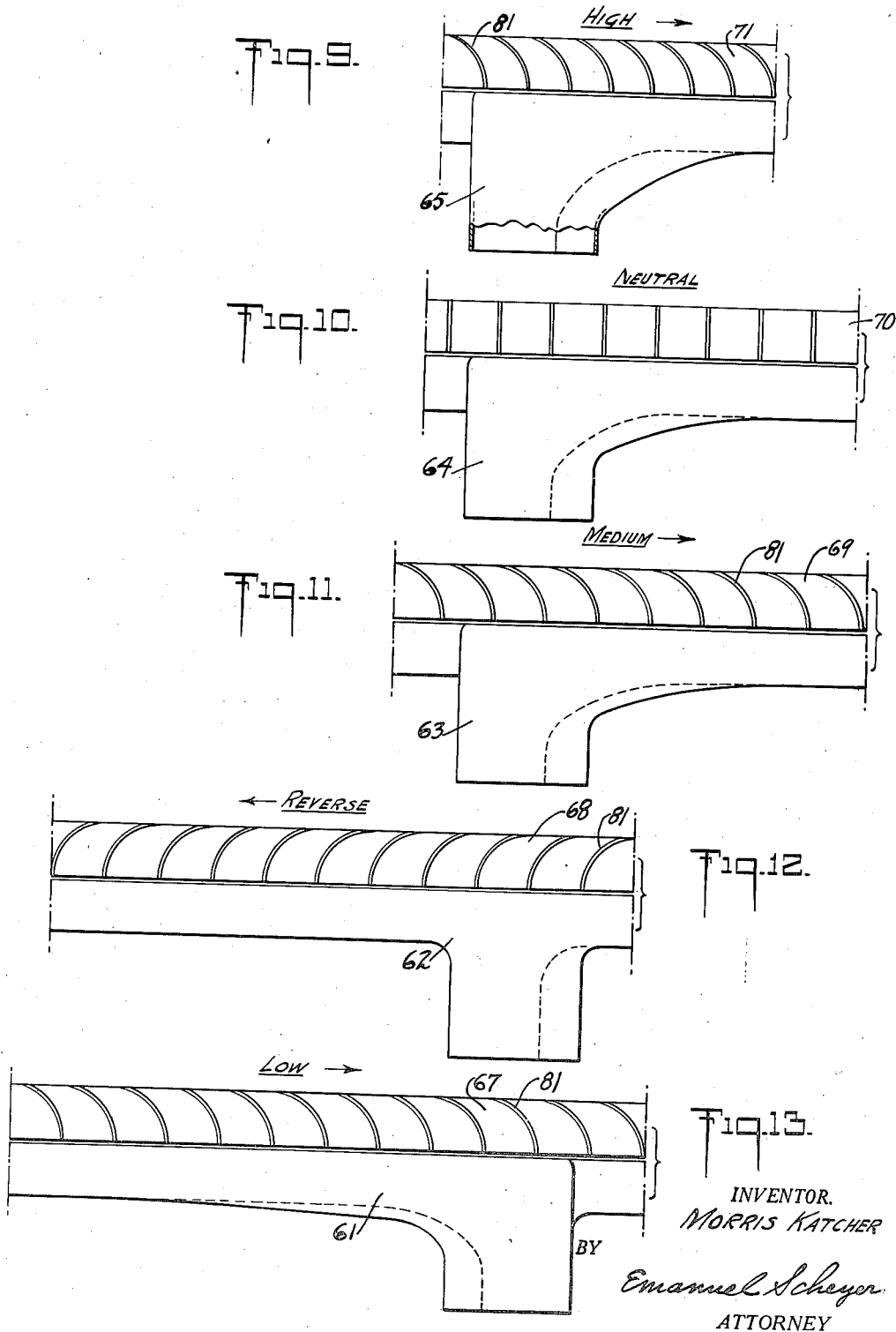

Patented Nov. 6, 1945

2,388,418

UNITED STATES PATENT OFFICE 2,388,418

HYDROKINETIC TORQUE CONVERTER

Morris Katcher, New York, N. Y.

Application September 3, 1943, Serial No. 501,096

8 Claims. (Cl. 60—54)

This invention relates to a torque converter. It is an object of the invention to provide hydraulic means which is particularly adapted to be used in hydraulic transmission devices for automobiles or the like (airplanes, boats etc.) and to provide improved means for circulating the operating fluid whereby the speed ratio between the driving shaft of the engine and the traction wheels or driving element of the automobile or vehicle may be varied to meet the various load conditions, so that the engine may be maintained at a comparatively constant speed and efficiently operated.

The rotor of my device comprises a plurality of annular channels of various radii through which the fluid is caused to pass selectively. The channels contain vanes. When the fluid is forced to flow through the outermost channel at a given rate, because of the greater leverage and circumferential distance traveled by the channel in its rotation, a greater torque is exerted and at lower speed than for channels located radially inward for the same rate of flow. It corresponds to the low speed or low gear drive of a gear transmission.

The fluid is forced through the rotor by means of an impeller or pump which is driven by the engine. A selective guide member is located intermediate of the pump and the rotor. Said member is provided with a plurality of passages or conduits which are adapted to be set manually so that the fluid may be directed to pass at will from the pump to any of said annular channels. When the fluid is directed to pass through the radially innermost channel the result corresponds to the high speed or high gear drive of a gear transmission. One of the channels has its vanes inclined in the opposite direction from those of other channels, which produces a reverse drive. In still another channel, the vanes are so set that the flow of fluid produces no driving action. This is neutral. If desired, the neutral channel may be without vanes.

Other objects and advantages will become apparent upon further study of the description and drawings, in which:

Fig. 1 is a plan of the torque converter shown in place in the chassis of an automotive vehicle, said chassis being shown in dotted lines.

Fig. 2 is a plan of the steering wheel of an automotive vehicle with the control portion of my device.

Fig. 3 is an elevation of the steering wheel and said control portion.

Fig. 4 is a longitudinal section of the torque converter.

Fig. 5 is a cross section of the device taken along the line 5—5 of Fig. 4 and looking in the direction of the arrows.

Fig. 6 is a cross section of the device taken along the line 6—6 of Fig. 4 and looking in the direction of the arrows.

Fig. 9 is a developed plan of the high speed conduit, the up and down direction on the drawings corresponding to the axial direction of the device.

Fig. 10 is a developed plan of the neutral conduit taken as in Fig. 9.

Fig. 11 is a developed plan of the medium speed conduit taken as in Fig. 9.

Fig. 12 is a developed plan of the reverse conduit taken as in Fig. 9.

Fig. 13 is a developed plan of the low speed conduit taken as in Fig. 9.

Figure 7:
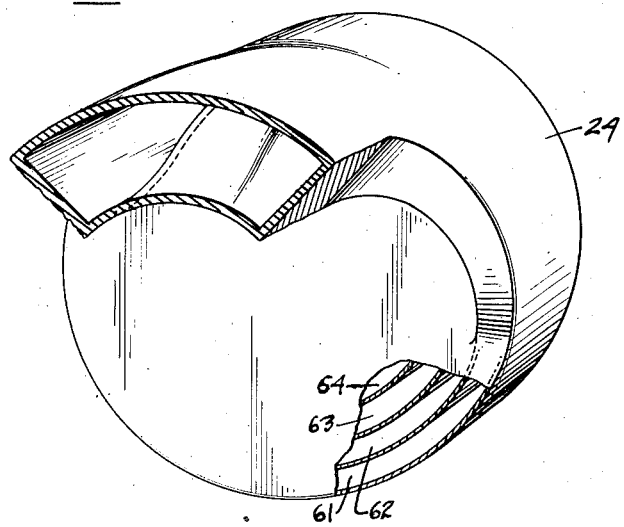
Fig. 7 is a perspective view of the selective guide member removed from the device, with all inlets broken away except that for the low speed conduit.
Figure 8:
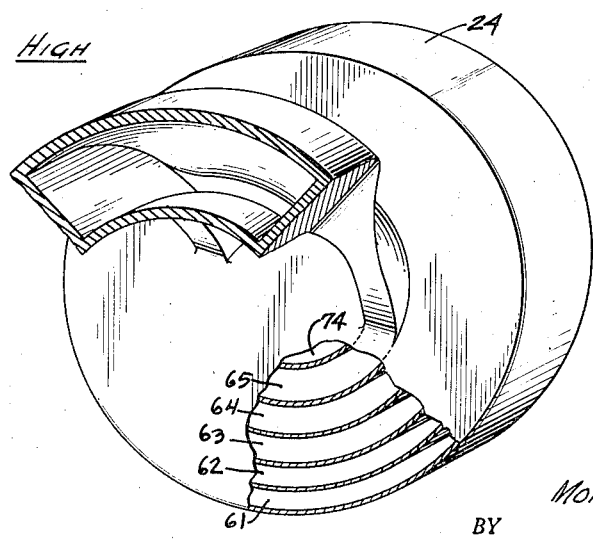
Fig. 8 is a perspective view of the selective guide member removed from the device, with all inlets broken away except that for the high speed conduit.

Crankshaft 31 of motor 30, Figs. 1 and 4, is enclosed in motor housing 29. Attached to said housing by bolts 34 is housing 33 of the torque converter. Crankshaft 31 extends into housing 33 where it is provided with a bearing 38 near its end. The end of shaft 31 is recessed to provide a bearing 35 for one end of driven shaft 36 of the converter. The other end of shaft 36 is supported in bearing 37 at the rear end of housing 75. Liquid tight seal 28 prevents escape of fluid from housing 33 along crankshaft 31, while liquid tight seal 39 prevents escape of fluid from the other end of said housing along shaft 36. As is usual in motor vehicles, a starting gear 32 is fixed to crankshaft 31, which gear is engaged by the starting mechanism, not shown. A collar 40 is provided for streamlining the fluid past bearing 35.

Impeller wheel 41 is fixedly mounted on crankshaft 31. This wheel has vanes 27 after the manner of the impeller of a centrifugal pump. Impeller wheel 41 has its intake at 26 and discharges its fluid into volute 42 which forms part of housing 33. The discharge opening of volute 42 is located at 43, the discharge being axial. Housing 33, with volute 42, to the left of joint 25, is stationary. Housing 44, around selective guide member 24, and about rotor 66 and housing 75 about return baffles 76 are fastened to each other with housing 44 attached to housing 33 and volute 42. All of said housings are mounted on the chassis of the vehicle or other body carrying motor 30.

Fluid from discharge opening 43 of the volute enters the selective guide member 24, that is enters one conduit thereof. In the particular embodiment of the invention shown herein, the guide member is provided with five conduits. They are, Figs. 9–13, the low speed conduit 61, reverse conduit 62, medium or second speed conduit 63, neutral conduit 64 and high speed conduit 65. One end of each conduit can be set, by revolving guide member 24, opposite opening 43 to receive the fluid therefrom. The other end of each conduit when so set comes opposite its corresponding annular compartment of rotor 66. In Fig. 4 the low speed conduit 61 is in operative position, one end 86 being set opposite opening 43 thereby receiving fluid from the pump, while its opposite end is set to discharge into the low speed compartment 67 of rotor 66.

In order to enable guide member 24 to be revolved into its various positions for the purpose noted above, said member is rotatably mounted inside of housing 44, four roller bearings 55 being provided for this. Rotor 66 is fixedly mounted on converter or driven shaft 36, which is connected by coupling 58 and 59 to drive shaft 60, Fig. 1. Said rotor has five annular compartments corresponding to conduits 61–65. These compartments are low speed compartment 67, reverse compartment 68, medium or second speed compartment 69, neutral compartment 70 and high speed compartment 71.

Each of said compartments is provided with vanes or blades 81 as shown in Figs. 9–13, against which the moving fluid reacts to cause motion of the rotor except in the case of blades 81 of neutral compartment 70. In the case of compartments 67, 69 and 71 the blades are inclined in a direction corresponding to forward motion of the vehicles driven by the motor. In the case of reverse compartment 68, the blades are inclined in the opposite direction so that when the fluid reacts against them the vehicle is driven in reverse. In the case of neutral compartment 70, the blades are set so that the fluid passes through without inducing any rotation of rotor 66. Rotor 66 has a hub 57 keyed to shaft 36. Spokes 56 extend from hub 57 to the inner wall 72 of the rotor. Wall 72 defines a return chamber 73 for the fluid. In line with wall 72 is the wall 46 of selective guide member 24, providing a return chamber 74 as a continuation of return chamber 73. In line with rotor compartments 67–71 are spaces defined by annular return baffles 76–80.

The entire space inside of housings 42, 44 and 75 is filled with fluid except for a small space at the top to provide for expansion of the fluid due to heating.

When impeller 41 is rotated by motor shaft 31, liquid is forced out of outlet 43 into the particular conduit of the conduits 61–65 which has its inlet end set opposite said outlet. As will be explained, mechanism is provided for setting the inlet end of any of said conduits opposite outlet 43 for receiving and guiding the fluid to rotor 66. As shown in Fig. 4, the inlet end 86 of conduit 61 is set opposite pump outlet 43. The outlet end of conduit 61 discharges into the low speed compartment 67 of rotor 66, causing the latter to rotate shaft 36 with high torque but low speed.

After leaving compartment 67, the fluid is directed by baffles 76 and 77 against the rear wall of housing 75 which is so curved as to send the fluid back axially into return chambers 73 and 74 back to the inlet 26 of impeller wheel 41.

If the inlet 90 of conduit 65 were set opposite pump outlet 43, the fluid would be guided into the high speed compartment 71 and in passing out therefrom be deflected back by baffle 80 and the rear wall of housing 75 into return chambers 73 and 74 to the inlet of the pump or impeller.

In a similar manner, the setting of the inlet opening of the other conduits opposite the pump or impeller outlet, causes the fluid to pass through their corresponding compartments of the rotor.

As has been already noted, selective guide member 24 is rotatably mounted inside of housing 44, to enable the several inlets of its conduits 61–65 to be set opposite outlet 43 of the pump. The setting mechanism in the particular embodiment thereof shown herein comprises a threaded pulley 82 provided at the forward end of wall 46 on its outside, which pulley is engaged by several turns of endless cable 83. The runs of the cable pass out through the housing of the converter and over a pulley 47, Fig. 1, located near the floor of the vehicle not far from steering post 84. Concentric with pulley 47 and fixed thereto is gear wheel 48 whose teeth engage the teeth of gear sector 49. The other end of gear sector 49 is fixed to the bottom of shaft 50 rotatably mounted on steering post 84. The upper end of shaft 50 has hand lever 51 fixed to it. Hand lever 51 slides under indexed quadrant 52, the latter being fixedly mounted on steering post 84 just under steering wheel 53. The position of hand lever 51 on quadrant 52 indicates the setting of the selective guide member. As lever 51 is rotated, sector 49 rotates gear 48 and with it pulley 47, causing cable 83 to rotate pulley 82 and selective guide member 24.

The terms, pulley, pulley means, and cable as used in the claims are considered as equivalent to a chain and sprockets.

The various inlets of selective guide member 24 are seen in Fig. 6, but their connections to their various conduits are only partially indicated. It can be readily understood, however, that the reverse inlet 88 connects with conduit 62, neutral inlet 87 with conduit 64, low speed inlet 86 with conduit 61, medium speed inlet 89 with conduit 63 and high speed inlet 90 with conduit 65. The radial depth of the annular portion of conduits 61–65 and their corresponding rotor compartments 67–71 increases the nearer they are to their axis of rotation. This offsets their decreasing circumferential length so that they offer substantially the same capacity for the flow of liquid through them.

I claim:

1. In a hydro-kinetic torque converter, a motor driven pump, a movably mounted selective guide member for receiving the fluid from the pump, a rotor divided into a plurality of annular compartments of various radii, said member having a plurality of conduits, each of said conduits continuously communicating at one end with a corresponding one of said compartments and adapted to be set at its other end opposite the outlet of the pump, each conduit leading fluid from the pump to its corresponding compartment when said other end is set opposite said outlet, said rotor being driven by the flow of the fluid through the compartment selected, and means for setting the guide member.

2. In a hydro-kinetic torque converter, a motor driven rotary pump, a rotatably mounted selective guide member for receiving the fluid from the pump, a rotor divided into a plurality of annular compartments of various radii, the pump, guide member and rotor having their axes of rotation in substantial alignment, said member having a plurality of conduits, each of said conduits continuously communicating at one end with a corresponding one of said compartments and when set at its other end in register with the outlet of the pump, leading the fluid to said one of said compartments, said rotor being driven by the flow of the fluid through the compartment selected, and means for setting the guide member in various positions to bring the conduits in register with the outlet of the pump.

3. In a hydro-kinetic torque converter, a motor driven pump, a movably mounted selective guide member for receiving the fluid from the pump, a rotor divided into a plurality of annular compartments of various radii, said member having a plurality of conduits, each of said conduits continuously communicating at one end with a corresponding one of said compartments and adapted to be set at its other end opposite the outlet of the pump, each conduit leading fluid from the pump to said one of said compartments when said other end is set opposite said outlet, means for setting the guide member, and a deflection member formed to receive the fluid from the rotor and to deflect it radially inward and axially back through a center passage provided in the rotor and guide member to the inlet of the pump.

4. In a hydro-kinetic torque converter, a motor driven pump, a rotatably mounted selective guide member for receiving the fluid from the discharge orifice of the pump, a rotor divided into a plurality of annular compartments of various radii, the axes of rotation of the rotor and guide member being in substantial alignment, said guide member having a plurality of inlets adapted to be rotated one at a time into register with said orifice, said guide member having a plurality of passages and a plurality of annular chambers of radii substantially corresponding to the radii of said compartments, the chambers and compartments of the same radius being in register, each of said passages leading from a particular inlet to a particular chamber, and means for rotating the guide member to set any of said inlets in register with the orifice for selectively guiding the fluid from the pump into any of said compartments, said rotor being actuated in accordance with the flow of the fluid through the compartment selected.

5. In a hydro-kinetic torque converter, a motor driven pump, a selective guide member for receiving the fluid from the discharge orifice of the pump, a rotor divided into a plurality of annular compartments of various radii, said guide member being adapted to guide the fluid from the pump into any of said compartments in accordance with the relative setting of said member with respect to said orifice, said rotor being actuated in accordance with the flow of the fluid through the compartment selected, means for effecting said relative setting and a fixedly mounted casing enclosing the pump, guide member and rotor, said casing having a portion extending beyond the rotor for receiving the discharge therefrom, the guide member and rotor having a central passage extending through them in alignment with the intake of the pump, said portion directing the fluid from the rotor radially inward and backward through said passage to the intake of the pump.

6. In a hydro-kinetic torque converter, a rotary pump having a discharge orifice and having its impeller mounted on the crank shaft of a motor and driven thereby, a rotor mounted on a driven shaft and driving the latter, the driven shaft being rotatably mounted in alignment with said crank shaft, a selective guide member rotatably mounted upon one of said shafts intermediate the pump and the rotor, said rotor being divided into a plurality of annular compartments of various radii, said guide member having a plurality of conduits, each of said conduits individually being adapted to receive substantially the full discharge from the orifice of the pump and to guide fluid so received to a particular compartment in accordance with its relative rotation with respect to said orifice, said rotor being actuated in accordance with the flow of the fluid through the compartment receiving the fluid at any time and means for effecting the relative rotation of the guide member with respect to said orifice.

7. In a hydro-kinetic torque converter for use in a motor driven vehicle, a motor driven pump, a selective guide member for receiving the fluid from the discharge orifice of the pump, a rotor divided into a plurality of annular compartments of various radii, said guide member having a plurality of conduits, each conduit being adapted to guide the fluid from the pump into a selected compartment in accordance with the relative setting of said member with respect to said orifice, said rotor being actuated in accordance with the flow of the fluid through the compartment selected and mechanism extending from said guide means substantially to the steering means of the vehicle for effecting said relative setting.

8. In a hydro-kinetic torque converter for use in a motor driven vehicle, a motor driven pump, a rotatively mounted selective guide member for receiving the fluid from the discharge orifice of the pump, a rotor divided into a plurality of annular compartments of various radii, said guide member having a plurality of conduits, each of said conduits individually being adapted to receive substantially the full discharge from the orifice of the pump and to guide fluid so received to a particular compartment in accordance with the relative rotation of said member with respect to said orifice, said rotor being actuated in accordance with the flow of the fluid through the compartment receiving the fluid at any time, mechanism extending from the guide member to a location substantially adjacent the steering post of the vehicle for rotating said member and means substantially adjacent the steering wheel of the vehicle for manually operating said mechanism.

MORRIS KATCHER.